June 21, 1932. C. E. BERNARD 1,863,648
HAY PRESS DISCHARGE APPARATUS
Filed Dec. 8, 1931 2 Sheets-Sheet 1
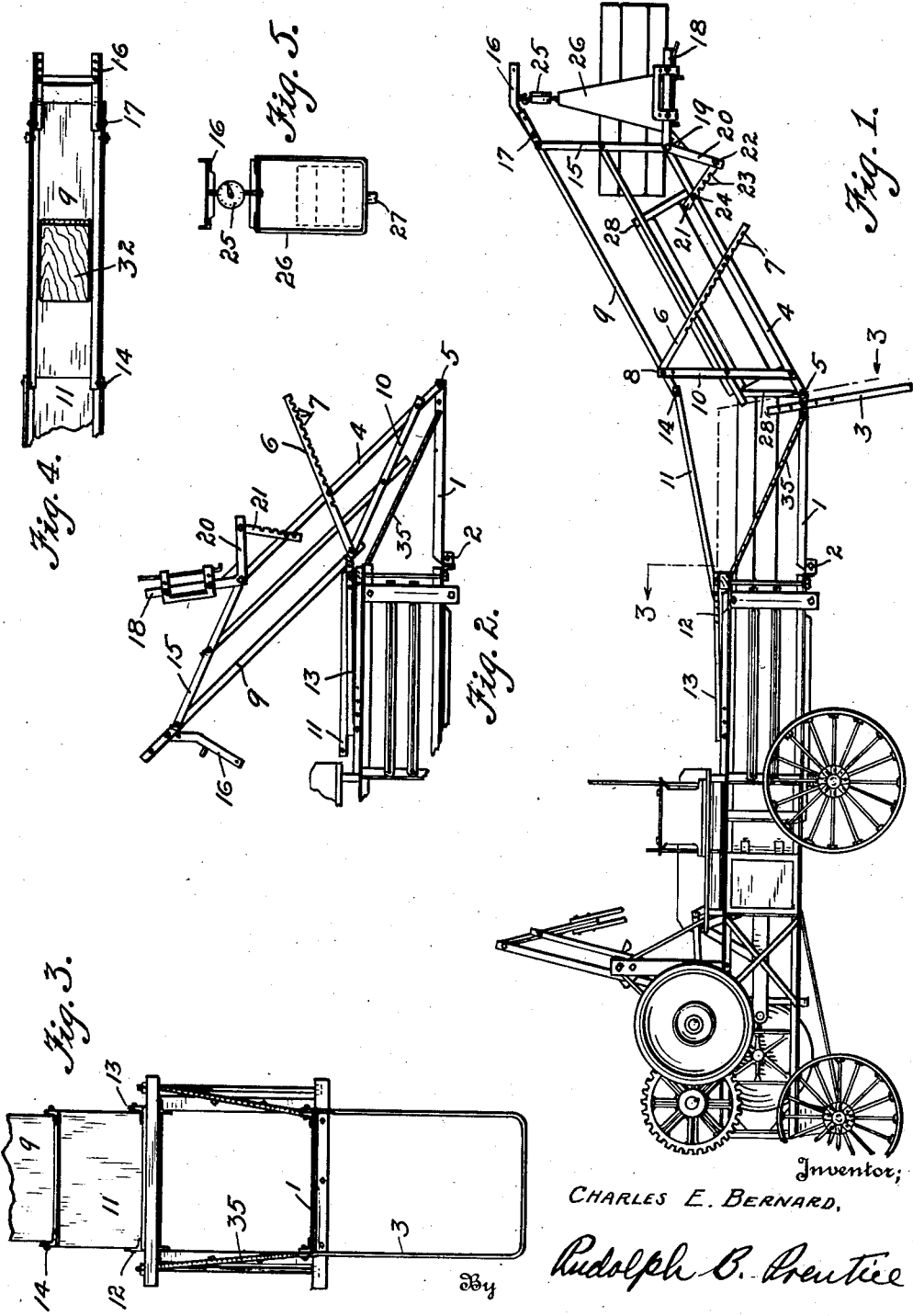
Inventor;
CHARLES E. BERNARD,
By Rudolph B. Prentice
his Attorney.

June 21, 1932.  C. E. BERNARD  1,863,648
HAY PRESS DISCHARGE APPARATUS
Filed Dec. 8, 1931  2 Sheets-Sheet 2

Inventor:
CHARLES E. BERNARD,
By Rudolph B. Prentice
his Attorney.

Patented June 21, 1932

1,863,648

UNITED STATES PATENT OFFICE

CHARLES E. BERNARD, OF BEAVERTON, OREGON

HAY PRESS DISCHARGE APPARATUS

Application filed December 8, 1931. Serial No. 579,679.

My invention relates to apparatus adapted for attachment to hay presses employing a power actuated plunger and adjustable friction means for retarding the movement of hay impelled by said plunger to compact the same into bales, and more particularly to a means for utilizing a portion of the work of said plunger ordinarily dissipated in said friction means.

The principal object of my invention is the saving of labor necessary to the operation of baling hay and loading the same for transportation or storage.

A secondary object is the construction of such an apparatus in portable form.

Other objects and advantages of my invention will be apparent in the following discourse wherein the significance of the reference characters in the accompanying drawings, details of construction of a typical apparatus embodying my invention, and the particular advantages thereof are explained.

Figure 1 represents in elevation a side view of the entire apparatus together with a hay press of usual design.

Figure 2 represents in elevation a side view of the apparatus of my invention in its folded position together with a fragment of the hay press above referred to.

Figure 3 represents a cross sectional view of the apparatus taken on the line 3—3 of Figure 1.

Figure 4 represents a plan view of a fragment of the apparatus.

Figure 5 represents in another aspect than shown in Figure 1 a fragment of the apparatus particularly illustrating a platform and scale ordinarily used.

Figure 6:
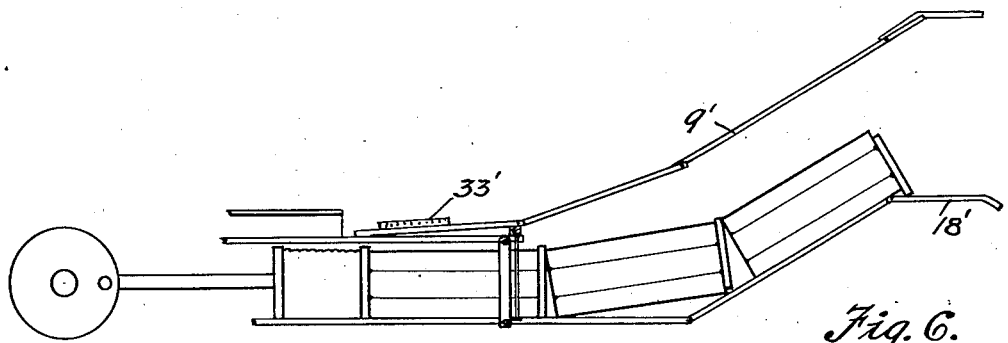
Figure 6 is a diagram illustrative of the manner of application to the apparatus of the mechanical principles involved.

My invention consists in the use of an inclined way upon which the hay from the press in the baled form is discharged and elevated to an altitude calculated to facilitate the handling of the bales in loading, transportation or storage together with certain angular relationships, inherent in the design, productive of certain valuable effects, and also a secondary inclined way which serves as a structural member and a slideway over which the divider-boards are returned to the press, the whole being capable of folding for movement of the apparatus from place to place without detachment from the press.

A horizontal plane 1 is hinged to the rearmost part of the hay press at 2, the opposite end thereof being supported by a leg 3 of adjustable length. To this horizontal plane 1 at its outermost end an adjustably inclined plane 4 is hinged thereto at 5 and supported at various angles of inclination by a pair of symmetrical diagonal members as 6 provided with series of suitable engagements as 7, the same being pivotally attached at 8 to a superposed inclined plane 9 where a vertical structural member 10 is also pivotally attached to transmit the vertical thrust imposed at this point to the inclined plane 4 below and thence to the ground through the leg 3.

Another inclined plane 11 is hinged at 12 to a pair of symmetrical pieces as 13 fixedly secured to the discharge end of the hay press. The two inclined planes 9 and 11 are detachably joined by loose-pin hinges at 14.

A pair of symmetrical vertical members as 15, representing the obverse one thereof, pivotally attached to both the inclined planes 4 and 9 complete a folding parallelogrammatic structure comprising the two parallel inclined planes 4 and 9 and the two pairs of pivotally attached vertical members as 10 and 15.

Appended to this structure are a scale-head 16 hinged at 17 to the inclined plane 9 and a delivery platform 18 hinged at 19 to the inclined plane 4 at the pivotal juncture therewith of the vertical member 15.

The delivery platform 18 is of the general form of a bell-crank in its lateral aspect when considered with a depending part thereof 20 which is the obverse one of a pair thereof rigidly related thereto. A variable angular relationship of this platform 18 with the inclined plane 4 is provided for by a pair of symmetrical pieces as 21 pivotally attached as at 22 to the depending parts as 20 of the delivery platform 18, and provided with a series of suitable engagements as 23 to secure the same in fixed position upon the inclined plane 4 which is fitted with a cooperating stud or other means as at 24.

For one manner of use the apparatus is equipped with a scale and depending platform 25 and 26 respectively hung to the scale-form 16, the depending platform thereof being provided with a guide-piece 27 (Figure 5) slidable vertically in an aperture in the delivery platform 18 (Figure 1).

The operation and manner of use of the apparatus in connection with the hay press is as follows:

That portion of the tension on the relief springs of the hay press ordinarily used, which is equal to that the effects of which will require a work input requisite to elevate the baled hay upon the inclined plane 4, is released. The resistance imposed upon the bales discharging from the press, by the bales rising upon the inclined plane 4 supplements that remaining portion of the total resistance necessary to efficient operation of the press imposed by the friction means incorporated in the hay press. Thus, the total resistance to the movement of the pressed hay, when the apparatus of my invention is employed, comprises that imposed in the hay press by the usual means but of a lesser magnitude, plus that imposed by the bales rising on the inclined plane 4.

Figure 7:
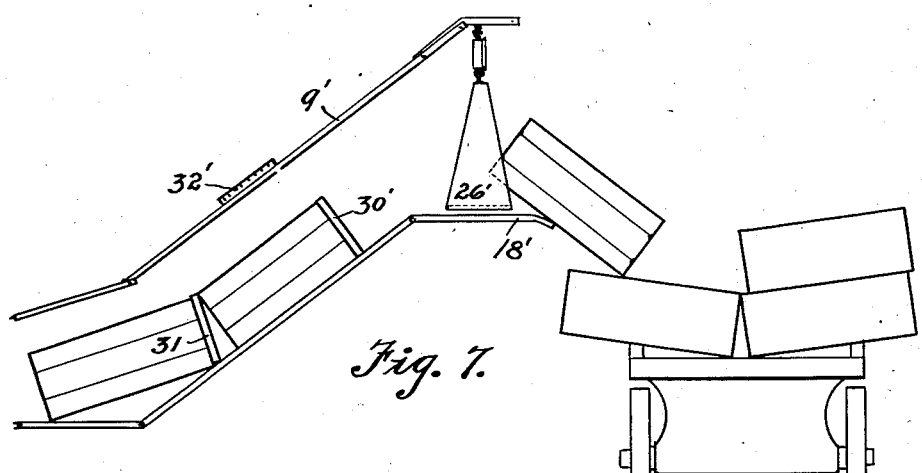
Figure 7 is a diagram illustrative of a manner of use of the apparatus to facilitate the loading of baled hay for transportation.

When this adjustment has been made the press is fed and operated in the usual manner and the bales will be delivered at the delivery platform 18′, Figure 6, or directly upon the scale platform 26′, Figure 7, where the weight of each bale will be registered upon the scale. It is to be observed that each bale will be delivered upon the scale platform independently of every other bale, as illustrated in Figure 1, and, owing to the intermittent nature of the impelling force contributed by the plunger of the machine each bale will rest free upon the scale platform and accurate indications of weight registered. All of which accrues out of the relationship of the horizontal delivery platform and the inclined plane adjacent thereto and the intermittent nature of the plunger action above mentioned.

When the scale is used in the apparatus, as when hay is being loaded for transportation, Figure 7, the divider-boards, indicated at 28 and 29 in Figure 1 and at 30′, 31′, and 32′ in Figure 7, are placed on the upper inclined plane 9′ in Figures 6 and 7, down which they slide to the position indicated by that one 33′ illustrated in Figure 6 where the press operator may easily reach them for further use in the press.

Figure 8:
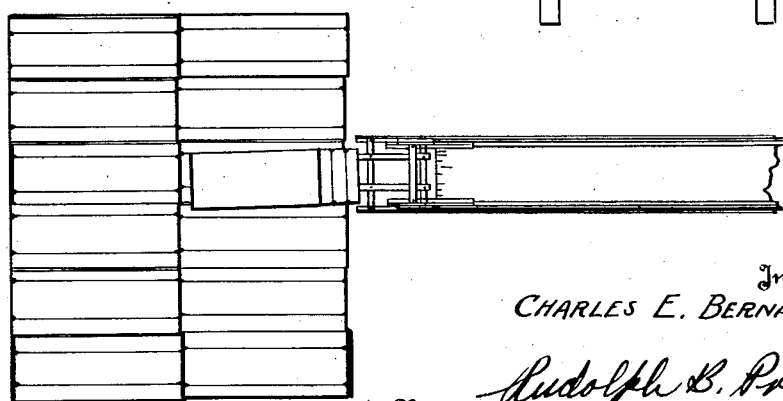
Figure 8 is a diagram illustrative of a manner of use of the apparatus to facilitate the loading of baled hay for storage on the ground.

In another use as when the scale is not employed and the hay is being stored upon the ground as illustrated in Figure 8, the delivery platform 18′, Figure 6, serves to retain the divider board until the man working at that end of the machine can deposit the bale just removed from the delivery platform and return to place the divider-board upon the return chute 9′, Figures 6 and 7.

It will be obvious that the bales of hay will be handled from this elevated position with a minimum of labor and effort; the apparatus ordinarily displacing the labor of two men in the operation of baling and loading hay.

To prepare the apparatus for movement from place to place or travel along the road or in the field, the loose-pin at the joint 14, Figure 1, is removed thus disconnecting the two planes 11 and 9. The plane 11 is rotated upon the remaining attachment in a counter-clockwise direction until it lies in the position whereat it is shown in Figure 2. Next, the parallelogrammatic structure, comprising the parts 4, 9, 10, and 15, is folded together by disengaging the diagonal pieces as 6 and forcing the two planes 4 and 9 into closer parallel relationship. The whole of this latter structure is then folded back upon the hinge at 5, Figure 1, in a counter-clockwise direction until it rests upon the hay press in that position shown in Figure 2. Finally, the scale-head 16 is pushed downwardly to diminish the overall height of the apparatus.

The apparatus is thus carried upon the hay press to its place of storage or next operation.

Owing to the length of the apparatus overhanging the wheels of the carriage of the hay press, travel over rough or uneven ground would be difficult if not impossible without damage to the apparatus were it not for still further provisions inherent in my invention to circumvent this annoyance.

In Figures 1 and 2 it will be observed that the outermost end of the horizontal plane 1 is supported by a diagonal tie member 35 of chain or the like, capable of compression but rigid in tension. If the rear wheels of the press carriage sink into a depression in the ground and cause contact of the plane 1 therewith, the hinge at 2 will be flexed, the bight of chain 35 will hang loose and movement of the entire vehicle accomplished without damage to its parts or those of the apparatus appended.

Upon setting up the apparatus again for operation on uneven ground, the leg 3 is adjusted to the proper height, and the inclination of the planes 4 and 9 adjusted by means of the diagonal 6. The delivery platform is likewise leveled by means of the member 21, and the hinged joint 12 at the end of the plane 11 is located at that one of the engagements provided in the parts as 13 which is most convenient.

Having described my invention what I claim is:

1. A hay press discharge apparatus comprising, a horizontal way adapted for hinged attachment to the hay press to receive the bales discharged therefrom, a chain or other supporting means to limit the downward movement of said horizontal way, a parallelogrammatic structure of two inclined ways to convey the bales to an elevated position and serve as a chute down which divider boards may be returned to the press respectively and suitable vertical members pivotally joined to said inclined ways the same being joined to the remaining extremity of said horizontal way by hinge means, and a way adapted for hinged attachment to the hay press and the remaining one of said inclined ways.

2. A hay press discharge apparatus comprising, an inclined way to convey baled hay to an elevated position, a second inclined way to convey divider boards back to the hay press, wherein the two said inclined ways are pivotally joined by vertical members in a manner to provide for the folding thereof together, and means for attaching the same.

3. A hay press discharge apparatus comprising, an inclined way to convey baled hay to an elevated position, a second inclined way to convey divider boards back to the hay press, vertical structural members pivotally attached to said inclined ways, hinged attaching means to connect the apparatus to the press and means to support the same.

4. In hay press discharge apparatus, the combination with means to attach and support the same upon the press of a way to receive the discharged baled hay from the press comprising a horizontal portion for attachment adjacent the hay press, an inclined portion to carry the bales to an elevated position and a further horizontal portion to receive the bales for final delivery, together with an inclined way foldably supported upon said other way adapted to carry divider boards back to the press and a portion of whose extent may be removed to permit of folding the apparatus back upon the hay press for transportation.

CHARLES E. BERNARD.